J. A. NORDIN.
FEED DEVICE FOR MEAT SLICING MACHINES.
APPLICATION FILED FEB. 20, 1922.
1,438,459.
Patented Dec. 12, 1922.
2 SHEETS—SHEET 1.
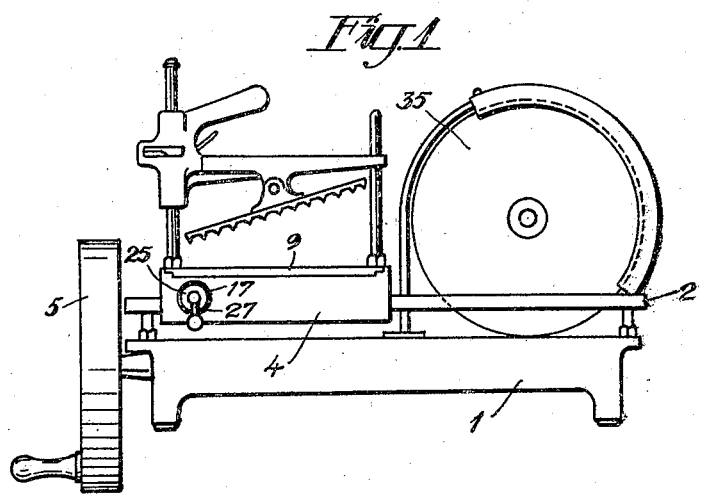
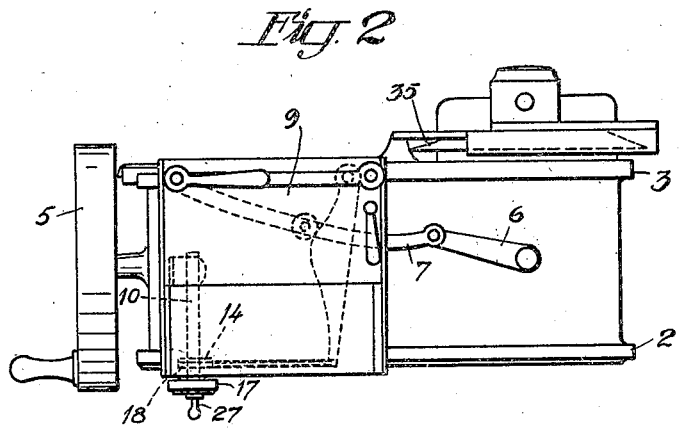
Inventor
J. A. Nordin,
By Marks & Clerk
Attys.

J. A. NORDIN.
FEED DEVICE FOR MEAT SLICING MACHINES.
APPLICATION FILED FEB. 20, 1922.
1,438,459. Patented Dec. 12, 1922.
2 SHEETS—SHEET 2.
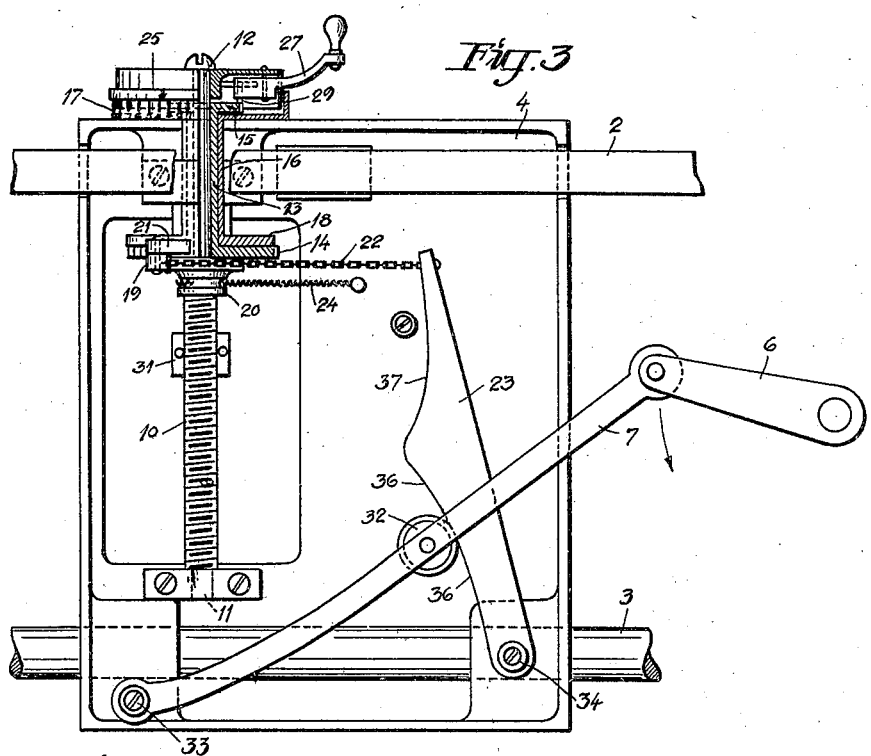
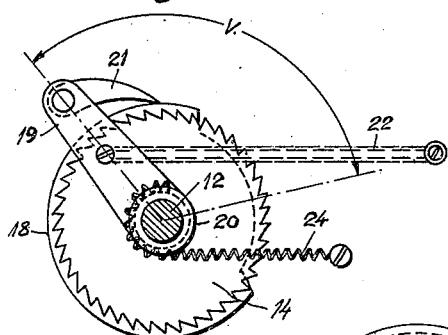
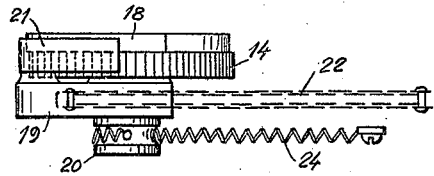
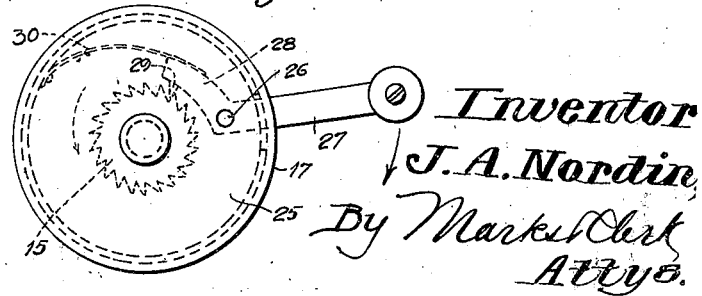

Patented Dec. 12, 1922.

1,438,459

UNITED STATES PATENT OFFICE.

JOSEF AUGUST NORDIN, OF STOCKHOLM, SWEDEN, ASSIGNOR TO AKTIEBOLAGET STILLE-WERNER, OF STOCKHOLM, SWEDEN, A CORPORATION OF SWEDEN.

FEED DEVICE FOR MEAT-SLICING MACHINES.

Application filed February 20, 1922. Serial No. 538,006.

*To all whom it may concern:*

Be it known that I, JOSEF AUGUST NORDIN, a subject of the King of Sweden, residing at Götgatan 14, Stockholm, in the Kingdom of Sweden, have invented certain new and useful Improvements in Feed Devices for Meat-Slicing Machines, of which the following is a specification.

This invention relates to meat-slicing machines of the type, in which the table, carrying the meat, etc., and provided on a reciprocating slide, is intermittently advanced transversally of the cutting direction by means of a feed screw, journaled in the slide and rotated by a swingable spring-actuated lever arm by means of a motion transmitting device.

In machines of this type the feed screw and the means, more or less complicated, for rotating the same, hitherto have been located close to the said table and at a level higher than its top surface. The said arrangement, evidently, is not satisfactory in hygienic respect, owing to the fact that sticking of meat, etc., to the projecting members (such as feed screw, ratchet wheel, pawls and so on) cannot be prevented, the cleaning of which may not be effected in a satisfactory manner without a circumstantial and troublesome disengaging of the said members.

The object of the present invention is to remove the said disadvantages, which is effected by a special construction of the feed device, so that it may be provided entirely under the said table, which thus prevents the meat, etc., from coming into contact with the members of the feed device. The invention also comprises some special arrangements for facilitating the adjusting of the feed device and the actuating of same.

Figs. 1 and 2 in the accompanying drawings are a side view and a plan view of a meat-slicing machine arranged in accordance with this invention. Fig. 3 is a top view on a greater scale of the slide and the feed device. Figs. 4 and 5 are a side view and top view respectively of a pawl and ratchet mechanism belonging to the feed device. Fig. 6 shows a detail.

On guides 2 and 3 provided on the frame 1 of the machine a slide 4 is mounted, which is reciprocated by means of the crank 6 and the link 7 actuated by the shaft of the fly-wheel 5. The said slide 4 carries a table 9 for the meat, etc., which is movable transversally of the slide (or the disk-knife 35) and is provided with the nut-segment 31 or the like, which, engaging a screw spindle 10 located under the table and journaled in the slide 4, transmits motion from the said spindle to the table. The advancing of the table together with the meat should be effected during a very short period of the stroke of the slide and the amount of same determines the thickness of the slice.

The said spindle 10, Fig. 3, is screw-threaded for only a part of its length and its ends are arranged as journals 11 and 12. On the journal 12 a bearing sleeve 13 is rotatably mounted, which at its ends is provided with ratchet wheels 14 and 15. On the sleeve 13 an adjusting sleeve 16 is rotatably mounted, provided at its one end with a cup-shaped flange 17 and at its other end with a cam flange 18. The feed device is provided in the slide, between the said flanges 17 and 18. A sleeve 20 provided with an arm 19 is rotatably mounted on the journal 12, the said arm carrying a pawl 21, adapted to engage the ratchet wheel 14. To the arm 19 a chain 22 or the like is fixed, the other end of which is fixed to the end of a lever arm 23, which has a suitably shaped cam-surface and the other end of which is pivoted at 34 to the slide 4. The cam-flange 18 extends for a part of its periphery out-side the top line of the teeth of ratchet wheel 14, while the radius of the remaining part of the flange 18 is shorter than the radius of the bottom line of the said teeth, see Fig. 4. During each stroke of the slide a rotary motion comprising an unvariable angle $v$, Fig. 4, is imparted to the arm 19 through means described below. For a desired thickness of the slices gained through the cutting operation only an amount of the said rotary motion, corresponding to the said thickness, ought to be transmitted to the spindle 10 and the table 9. For the said purpose the sleeve 16 is rotatably mounted in the slide 4, so that by turning the flange 17 from outside the cam-flange 18 may be turned to the desired position. Immediately before the feeding of the' meat the arm 19 acted upon by the spring 24 has the position, shown in Figs. 4 and 5, in which the pawl 21 bears against the cam surface of the flange 18 and is held out of engagement with the ratchet wheel 14. If now the flange 18 is turned toward the left for a certain distance, the pawl 21 will engage the ratchet wheel 14 at an earlier moment, and if the flange is turned toward the right the pawl will engage the said wheel at a later moment, which results in the ratchet wheel 14 being turned for a greater or less angle respectively, while the pawl 21 is swung through the angle $v$. The said rotary motion of the wheel 14 is transmitted to the ratchet wheel 15, from which it is transmitted to the spindle 10 by means of a preferably cup-shaped cover 25, fixed to the end of the journal 12, and a mechanism comprising an angle lever 27, 28 pivoted to the cover 25 at 26. One arm 28 of the said lever is provided with a detent 29, which is normally held in engagement with the ratchet wheel 15 by a spring 30. The rotary direction of the wheel 15 during the feeding operation is indicated by the arrow, shown by dotted lines in Fig. 6.

As the nut-segment 31 has passed along the whole screw-thread of the spindle 10 or, if for some reason (for instance at change of article to be cut), the table 9 must be returned, the spindle 10 evidently must be rotated in the opposite direction. This is effected by rotating the arm 27, provided with a handle, in the direction indicated by the arrow, shown by full lines in Fig. 6, during which operation the detent 29 against the action of the spring 30 is held out of engagement with the ratchet wheel 15, so that the spindle is automatically disengaged from the sleeve 13. Also while the arm 27 is rotated in the direction opposite to that indicated by the arrow just mentioned, the spindle 10 is free from the sleeve 13, owing to the fact that the detent 29 rides on the teeth of the ratchet wheel 15.

The inermittent rotary motion of the feed device is effected in the following known manner. A roller 32 is provided on the arm 7 pivoted to the slide 4 at 33, which roller, while the crank 6 is rotated and the arm 7 is oscillated on the pin 33, passes on the cam-surfaces 36 and 37 of the lever arm 23, pivoted to the slide 34, and thus controls the movement of the same. In the position of the members shown in Fig. 3 the crank 6 is located near the dead centre, i. e., is near the moment at which the motion direction of the slide 4 is reversed. After the reversing the cutting operation begins, i. e., the slide 4 approaches the disk-knife 35 and passes the same. During the said operation the roller 32 moves along the cam surface 36 of the lever arm 23. The said cam surface 36 is arc-shaped having its centre located at the pin 33, which results in the lever arm 23 maintaining its position during the whole cutting operation. Members 22, 20 and 19 are so adapted, that the pawl 21 during the cutting operation is in engagement with the ratchet wheel 14 and thus locks the whole feed device. As the crank 6 has arriven to the other dead centre the return—or feed—movement of the slide 4 is started. During the greater part of this movement or until the table 9 and the meat carried by the same have passed the knife 35, the roller still moves on the cam surface 36 but then walks over to the cam surface 37. The said cam surface 37 is so shaped, that, while the roller 32 passes outward towards the free end of the lever 23, the latter, acted upon by the spring 24 and the members 19 and 22 is swung inward towards the spindle 10, so that the arm 19 together with the pawl 21 finally occupies the starting position, shown in Fig. 4, after the said arm has been swung through the angle $v$. As the motion direction of the roller 32 then is reversed, the roller 32, moving on the cam surface 37 in opposite direction, forces the lever arm 23 backwards, which results in the meat being fed forward.

The outer side of the flange 17 is provided with a scale with figures, which indicate the thicknesses of the slices, each figure corresponding to a tooth of the ratchet wheel 14. By rotating the flange 17, until a certain figure coincides with a fixed mark the feed device may be adjusted for a desired thickness of the slices, indicated by the said figure.

I claim:

1. In a feed device for meat-slicing machines the combination with a reciprocating slide, a table for the meat provided on the said slide and movable transversally of the cutting direction, and a feed-spindle for the said table, of a bearing for the said feed-spindle provided on the under side of the slide and comprising a sleeve, freely slidable on the spindle, means for intermittently rotating the said sleeve, and means connecting the sleeve and the spindle in a detachable manner, so that the spindle may be rotated manually in one direction or the other.

2. In a feed device for meat-slicing machines the combination with a reciprocating slide, a table for the meat provided on the said slide and movable transversally of the cutting direction, and a feed spindle for the said table, of a bearing for the said feed-spindle provided on the under side of the slide and comprising a sleeve, freely slidable on the spindle, means for intermittently rotating the said sleeve, a ratchet wheel provided on the said sleeve, and a spring actuated angle lever pivoted to the spindle, a detent on the lever, normally engaging the said ratchet wheel, and a handle on the lever for turning the lever and the spindle in one direction or the other.

3. In a feed device for meat-slicing machines the combination with a reciprocating slide, a table for the meat provided on the said slide and movable transversally of the cutting direction, and a feed spindle for the said table, of a bearing for the said feed-spindle provided on the under side of the slide and comprising a sleeve, freely slidable on the spindle, a ratchet wheel provided on the said sleeve, a pawl engaging the said ratchet wheel, a manually adjustable sleeve enclosing the said bearing sleeve and provided with a flange controlling the engagement of the said pawl with the said ratchet wheel, means for oscillating the said pawl, and means connecting the bearing sleeve and the spindle in a detachable manner, so that the spindle may be rotated manually in one or the other direction.

In testimony whereof I have affixed my signature in presence of two witnesses.

JOSEF AUGUST NORDIN.

Witnesses:
 INEZ SWENSON,
 ROBERT APELGREE.